(12) United States Patent
Wagh et al.

(10) Patent No.: US 8,811,430 B2
(45) Date of Patent: *Aug. 19, 2014

(54) PACKETIZED INTERFACE FOR COUPLING AGENTS

(75) Inventors: Mahesh Wagh, Portland, OR (US); Abhishek Singhal, Santa Clara, CA (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,068

(22) Filed: Mar. 23, 2012

(65) Prior Publication Data

US 2012/0176909 A1  Jul. 12, 2012

Related U.S. Application Data

(63) Continuation of application No. 12/431,988, filed on Apr. 29, 2009, now Pat. No. 8,170,062.

(51) Int. Cl.
*H04J 3/00* (2006.01)
*G06F 13/38* (2006.01)

(52) U.S. Cl.
CPC .................. *G06F 13/385* (2013.01)
USPC ....................................... 370/476

(58) Field of Classification Search
USPC ......... 370/389, 476, 419, 400, 452, 280, 294, 370/369, 412, 414; 709/229, 250; 365/189.03
See application file for complete search history.

(56) References Cited

U.S. PATENT DOCUMENTS

| | | | |
|---|---|---|---|
| 5,943,341 A * | 8/1999 | Gazda, Jr. ..................... 370/452 |
| 6,009,488 A | 12/1999 | Kavipurapu | |
| 6,442,162 B1 * | 8/2002 | O'Neill et al. ................ 370/389 |
| 7,405,980 B1 * | 7/2008 | Azimi et al. ............. 365/189.03 |
| 7,873,068 B2 | 1/2011 | Klinglesmith et al. | |
| 2003/0110303 A1* | 6/2003 | Chen et al. ..................... 709/250 |
| 2004/0114609 A1* | 6/2004 | Swarbrick et al. ............. 370/400 |

(Continued)

FOREIGN PATENT DOCUMENTS

KR   10-2009-0027983   3/2009

OTHER PUBLICATIONS

German Patent and Trade Mark Office, Office Action mailed Feb. 28, 2013 in German application No. 11 2010 001 824.3.

(Continued)

*Primary Examiner* — Kwang B Yao
*Assistant Examiner* — Syed M Bokhari
(74) *Attorney, Agent, or Firm* — Trop, Pruner & Hu, P.C.

(57) ABSTRACT

In one embodiment, the present invention includes a fabric on a first semiconductor die to communicate with at least one agent on the die according to an on-chip protocol and a packetization layer coupled to the fabric to receive command and data information from the fabric on multiple links and to packetize the information into a packet for transmission from the die to another die via an in-package packetized link. Other embodiments are described and claimed.

20 Claims, 8 Drawing Sheets

(56) References Cited

U.S. PATENT DOCUMENTS

| | | |
|---|---|---|
| 2005/0036485 A1* | 2/2005 | Eilers et al. .................... 370/389 |
| 2005/0216596 A1* | 9/2005 | Mueller ........................ 709/229 |
| 2006/0101179 A1 | 5/2006 | Lee et al. |
| 2006/0268936 A1 | 11/2006 | Hong et al. |
| 2007/0002854 A1 | 1/2007 | Smith |
| 2007/0030862 A1* | 2/2007 | Michels ........................ 370/476 |
| 2007/0162645 A1 | 7/2007 | Han et al. |
| 2011/0080920 A1* | 4/2011 | Klinglesmith et al. ....... 370/419 |

OTHER PUBLICATIONS

Simon Knappe, "Bericht: PCI Express—Die Grundlagen" (PCI Express—The Basics), Jun. 2004, 1 page.

Korean Patent Office, Search Report and Written Opinion for PCT Application No. PCT/US2010/027604, dated Nov. 3, 2010, 6 pgs.

Chinese Patent Office, Search Report and Written Opinion mailed Dec. 3, 2013, in Chinese application No. 201080023538.4.

\* cited by examiner

US 8,811,430 B2

PACKETIZED INTERFACE FOR COUPLING AGENTS

This application is a continuation of U.S. patent application Ser. No. 12/431,988, filed Apr. 29, 2009 now U.S. Pat. No. 8,170,062, the content of which is hereby incorporated by reference.

BACKGROUND

Modern processors are increasingly integrating functionality such as graphics, display engines, security engines and others, PCIe™ ports (i.e., ports in accordance with the Peripheral Component Interconnect Express (PCI Express™ (PCIe™)) Specification Base Specification version 2.0 (published Jan. 17, 2007) (hereafter the PCIe™ specification) and other PCI-e™ based peripheral devices.

Processor based products are very complex in design but at the same time have to service a variety of market segments such as server, desktop, mobile, embedded, ultra-mobile and mobile Internet devices. Some markets seek to use single chip system-on-chip (SoC) solutions that combine at least some of processor cores, memory controller hub (MCH), input/output controller (ICH) and other segment specific acceleration elements onto a single chip. However, designs that accumulate these features are slow to emerge due to the difficulty of integrating different intellectual property (IP) blocks on a single die to native internal interconnects.

Some semiconductor integrated circuits (ICs) are implemented in a so-called multi-chip package (MCP) in which two or more die are integrated in a single package. Current techniques involve using a PCIe™ interconnect or other proprietary internal interconnects within the package for die-to-die connectivity. Both of these suffer from drawbacks including power consumption, spacing and routing issues and complexity, and with regard to proprietary designs, a lack of interoperability.

DETAILED DESCRIPTION

In various embodiments a packetized interface for a high speed and low power on-die or multi-chip (die-to-die, but within package) interconnect architecture can be realized. Such a packetized interface can be used to connect various devices such as an input/output (IO)/accelerator/graphics device or for sub-system attach for expansion. This packetized interface may have fewer wires, and as such can relieve routing congestion for an interface according to a given specification such as an on-chip interconnect fabric (referred to herein as an "OCF"), for both on-die and die-to-die (but within a single package) interconnects. The packetized interconnect provides for transmission of data, command, message, error reporting, credit, and protocol information bits over the same set of wires. Embodiments provide a scalable interconnect which allows extension of custom on-chip interconnect protocol(s) to two separate semiconductor devices on die with few wires by utilizing unique packetization techniques.

Still further, embodiments may be used to couple one or more independent logic blocks to be adapted within a semiconductor device. As used herein, the terms "agent" and "IP block" may be synonymous to denote such independent logics, each of which may originate with one or more different vendors and may be implemented on a single semiconductor die. Still further, a packetized interface enables an OCF fabric/interface to operate as a multi-cycle interconnect, thus providing the ability to tolerate interconnect delays (repeaters, flopped stages, etc.) as opposed to a tight cycle/timing-based OCF interface (e.g., a single cycle interface), and additionally provide power savings for die-to-die interconnects.

Embodiments may provide a protocol to be used in a multi-chip package or on-die interconnect that is compliant with an OCF protocol that can be based on a non-packetized protocol for communication of data, command and messages among IO devices (e.g., a network interface card (NIC) controller, an audio component, etc.). In this way, when using a packetized interface for on-die connectivity, a fabric (e.g., OCF) may be physically located on one corner of the die and an IP block located on another portion of the die, as communications can withstand multiple cycles. Thus a single cycle interface can be extended, allowing it to be multi-cycle.

Figure 1:
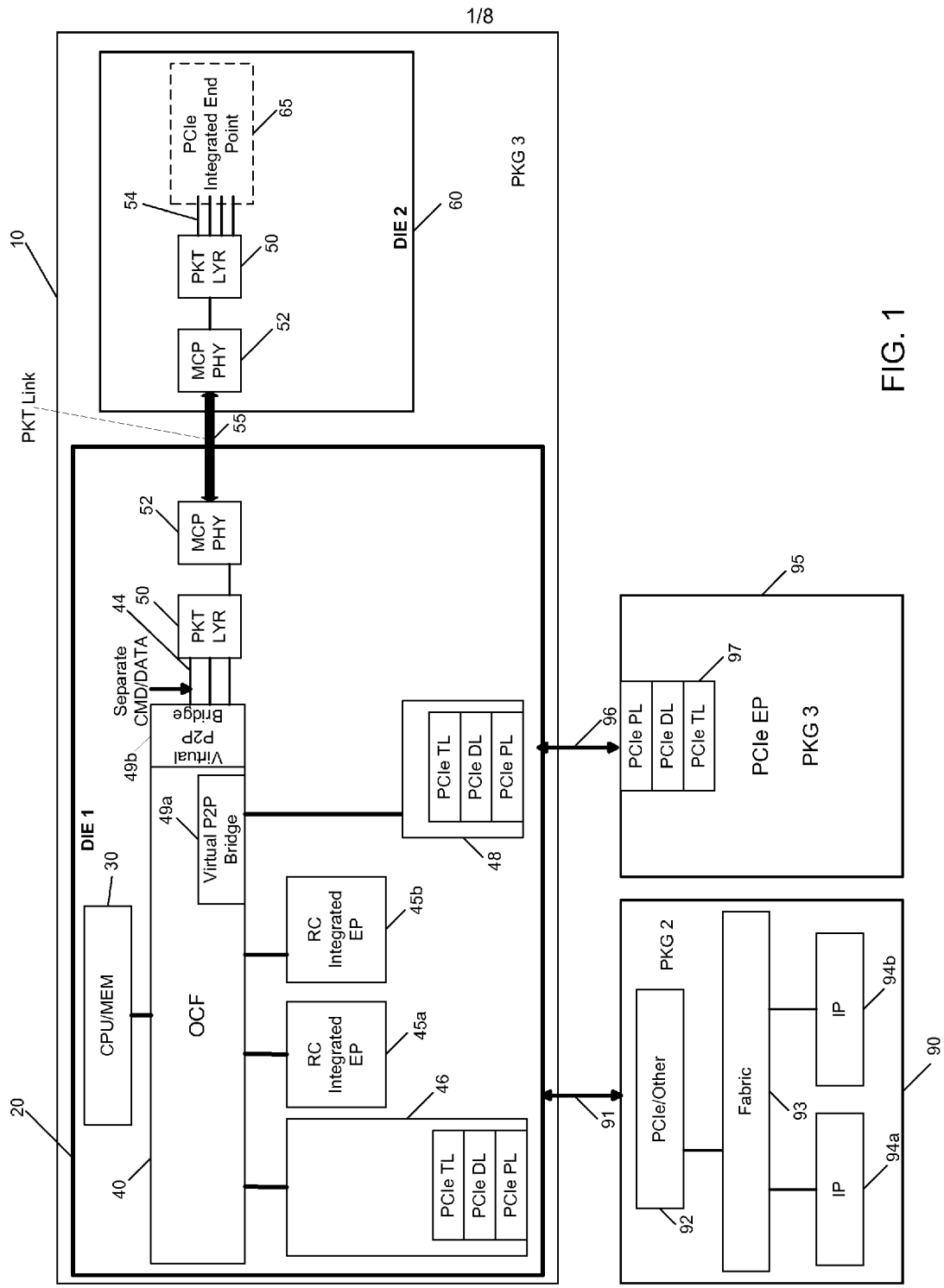
FIG. 1 is a block diagram of an architectural framework of a system-on-chip (SoC) in accordance with one embodiment of the present invention.

Referring now to FIG. 1, shown is a block diagram of an architectural framework of a system on chip (SoC). The embodiment of FIG. 1 shows an IO attach or IO sub-system expansion for a multi-chip solution for a SoC. More specifically, FIG. 1 shows a system implementation including a multi-chip package (MCP) 10 which in turn is coupled to several other packages, namely a second package 90 and a third package 95, which are coupled to MCP 10 via a given interconnect such as Peripheral Component Interconnect Express (PCIe™) interconnects 91 and 96.

As shown in FIG. 1, MCP 10 includes a first die 20 and a second die 60. First die 20 may be a system-on-chip including a processor complex 30 including a central processing unit (CPU), memory and associated interconnect. Note that the CPU may be formed of a plurality of cores which may be coupled together and to the memory (which may be a dynamic random access memory (DRAM)) by a ring, in some implementations. In some embodiments the memory might be attached to a package other than the CPU package. In turn, processor complex 30 may be coupled to a fabric 40, which may act as an interface to various on-chip agents. As examples of such agents, root complex (RC) integrated endpoints (EPs) 45a and 45b may be coupled to fabric 40. In addition, to provide interconnection to other packages 90 and 95, IO interconnects such as PCIe™ interfaces 46 and 48 may be present. As seen, each of these interfaces may include various interface layers including transaction layers (TL), data link layers (DL) and physical layers (PL) which are implemented in logic. Note that root port functionality to PCIe™ interface 48 may be implemented using a first virtual point-to-point (PTP) bridge 49*a*.

Fabric 40 implements an OCF interface protocol (i.e., a non-packetized protocol) that enables communications to various on-chip agents via a wide interconnect, e.g., including a number of wires (which can number in the many hundreds) including separate wires for command, data, and credits and further may include a sideband channel for various sideband communications. This on-die interconnect may be coupled to a second bridge 49*b*. Embodiments of the present invention can provide a packetized interface to enable more efficient on-die or intra-package communications.

In the particular embodiment of FIG. 1, MCP 10 includes a second die 60 that is coupled to first die 20 via an intra-package link 55 (referred to herein as a packetized link). This link may have substantially fewer wires (e.g., 40 or less in some implementations) than the native interconnect from fabric 40 for a given OCF interface specification. Thus to enable packetized communications in accordance with an embodiment of the present invention, first die 20 (and second die 60) may include logic for multiplexing command, data, message and protocol bits referred to herein as a packetization layer 50, and a MCP physical layer 52 which includes special IO circuits for transmitting signals over short (within package) distances, to enable communications across a packetized link 55. Such physical layer may be an analog front end having reduced electricals to enable communication over a short distance and a smaller number of wires than the typical interconnect to which fabric 40 couples. Further details of such layers and packetized link 55 will be discussed further below. In turn, native (i.e., according to the non-packetized OCF protocol) on-chip communications may occur between fabric 40 and packetization layer 50 via a native interconnect 44 and similarly via a native interconnect 54 coupled between packetization layer 50 of second die 60 and a given agent, namely agent 65, which in the embodiment of FIG. 1 may be a PCIe™ integrated endpoint.

As further seen in FIG. 1, second package 90 may include an interface 91, which may be a PCIe™ or other such interface to enable communication between interconnect 91 and a fabric 93, which in turn may be coupled to various agents such as IP blocks 94*a* and 94*b*. In turn, third package 95 may be a PCIe™ endpoint having a PCIe™ interface 97 including PCIe™ PL, DL and TL layers. While shown with this particular implementation in the embodiment of FIG. 1, the scope of the present invention is not limited in this regard.

Thus the architectural framework enabled by an embodiment of the present invention allows an OCF fabric and interface to be expanded and applied as a die-to-die interconnect. Various implementations can be used to couple many different types of device/sub-system attach: PCIe™ integrated endpoints such as IO devices, accelerators and, graphics devices; PCIe™-to-native endpoints such as IO devices, accelerators and graphics devices; and an IO sub-system sideband OCF fabric (switch or sideband OCF fabric on separate die for IO expansion). Such separate die may be, for example, a peripheral controller hub (PCH) or PCIe™ switch.

Figure 2:
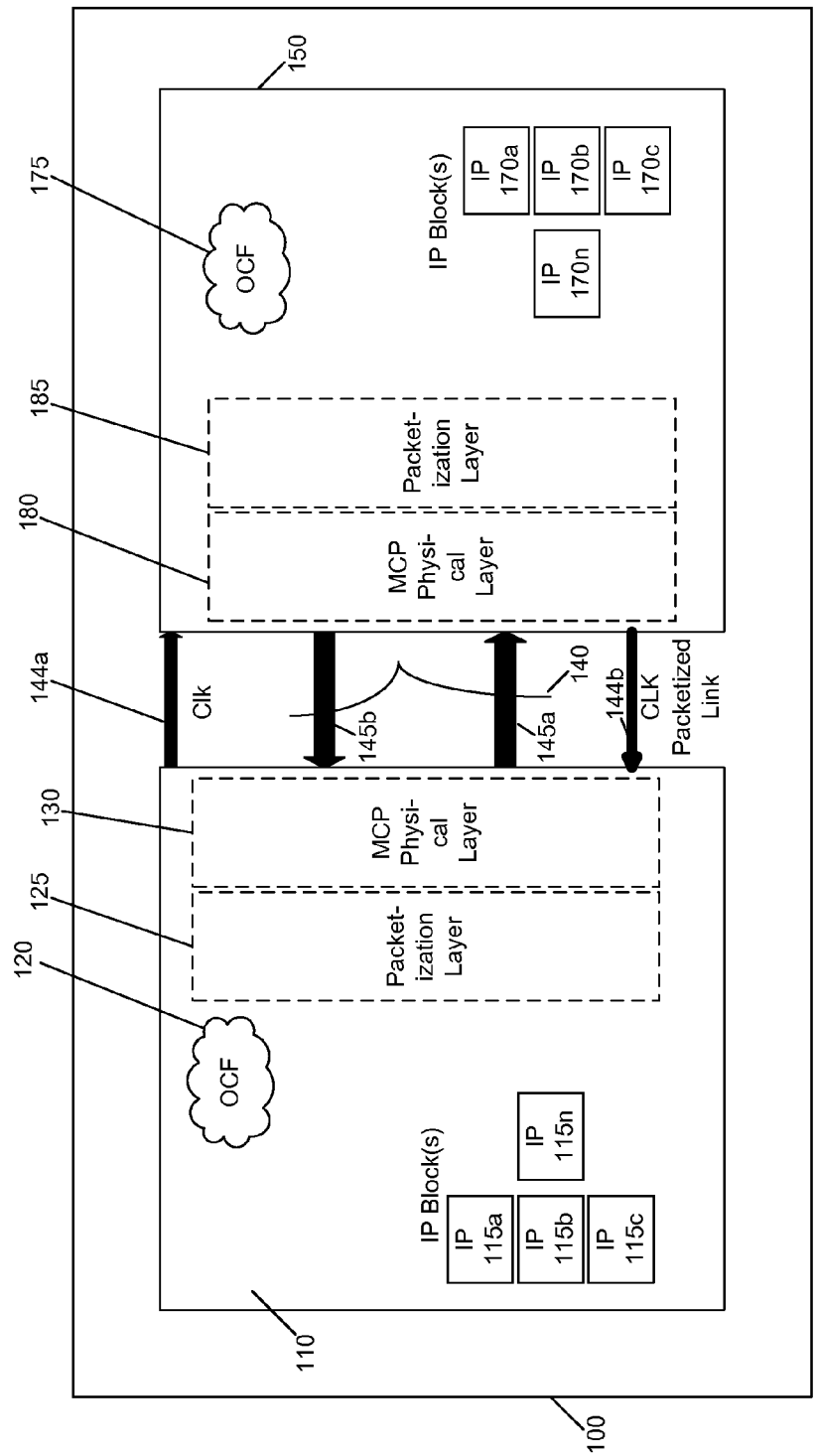
FIG. 2 is a block diagram of a package having two dies coupled via a packetized interface in accordance with an embodiment of the present invention.

Referring now to FIG. 2, shown is a block diagram of a package having two dies, each of which can have an OCF interface to connect IP blocks. Embodiments may connect these two die while preserving the OCF protocol for inter-die communication and utilizing fewer wires (than specified in an on-die OCF protocol). As such, an interface protocol and associated logic is set to interface with a native OCF interface, and create packets that can be sent over a fixed, limited set of wires.

As shown in FIG. 2, MCP 100 includes a first die 110 and a second die 150. In the embodiment of FIG. 2, first die 110 is a main die that includes one or more IP blocks 115*a*-*n*. As one example, main die 110 may be a system-on-chip including CPU and other circuitry. In turn, the IP blocks may be coupled to a fabric 120, which may be a native on-chip interface. To enable packetized communications with second die 150, a packetization layer 125 is coupled to fabric 120, and which in turn is coupled to a physical layer 130, which may be a MCP-specific physical layer, in a given implementation.

As seen in FIG. 2, a packetized interconnect 140 is provided on-package to couple first die 110 and second die 150. In the embodiment shown, link 140 may include a plurality of unidirectional lanes 145*a* and 145*b* in each direction. As will be described fully below, lanes may include a set of wires to act as packet lanes, as well as select and optionally sideband lanes and optionally a parity lane. Note that the link widths in both directions can be asymmetric and in addition the link speeds at which the links operate also be asymmetric. In addition, a clock signal may be forwarded via a clock link 144*a* from first die 110 to second die 150 and vice versa via clock link 144*b*. As seen, second die 150 includes a corresponding MCP physical layer 180 and corresponding packetization layer 185. In the embodiment shown in FIG. 2, packetization layer 185 may be coupled to a fabric 175 that in turn may be coupled to one or more IP blocks 170. While not shown in FIG. 2 fabric 175 which similarly implements a OCF protocol can be coupled to other agents both on-die and off-die. While shown with this particular implementation in the embodiment of FIG. 2, the scope of the present invention is not limited in this regard.

Note that a base OCF protocol such as implemented in the fabrics described above assumes a single cycle timing relationship between the time a fabric presents a grant signal (which is an acknowledgement to start transmitting request and/or data bits) and the time the action happens. This relationship can present a limitation on enabling this protocol across two dies within a package, where such guarantees are extremely hard, if not impossible to enable. This is so, as various constants can exist. As examples, package size constraints, IP block sizes and the layout of various IP blocks and their connectivity to a central IO sub-system fabric are used by place and route tools to connect and route wires. These parameters cause certain conditions where the routing delay starts to dominate the timing budget required for signaling and sampling an event between two IP blocks. Such delays can be mitigated by adding staging buffers or flops in the interconnect channel. Interface protocols that are based on tight timing requirements (e.g., single cycle or combinatorial request/acknowledge assumptions) create significant issues in placement and routing of signals, which typically add complexity and delay the back-end flows.

Embodiments thus may be used to provide a packetized OCF interface and protocol that can operate across multi-cycle paths between two ends of an interconnect, specifically an on-chip interconnect. The packetized OCF interface can tolerate multi-cycle paths, i.e., is decoupled from any tight timing requirements between the two ends of the link and thus eases the back-end flows and helps attain faster timing closures for designs.

The multi-clock cycle path is enabled by explicitly reserving space in destination buffers associated with an OCF interface or in a packetization layer implementation on a receiving die and by exchanging credits to that buffer. An agent on the receive side then arbitrates for the common shared bus (i.e., the packetized link). The OCF protocol is preserved in the process by preserving both header and data bits as well as by maintaining a dedicated bus between the two chips. This assumption is also true when OCF packetization is applied to on-die logic to reduce congestion.

Figure 3:
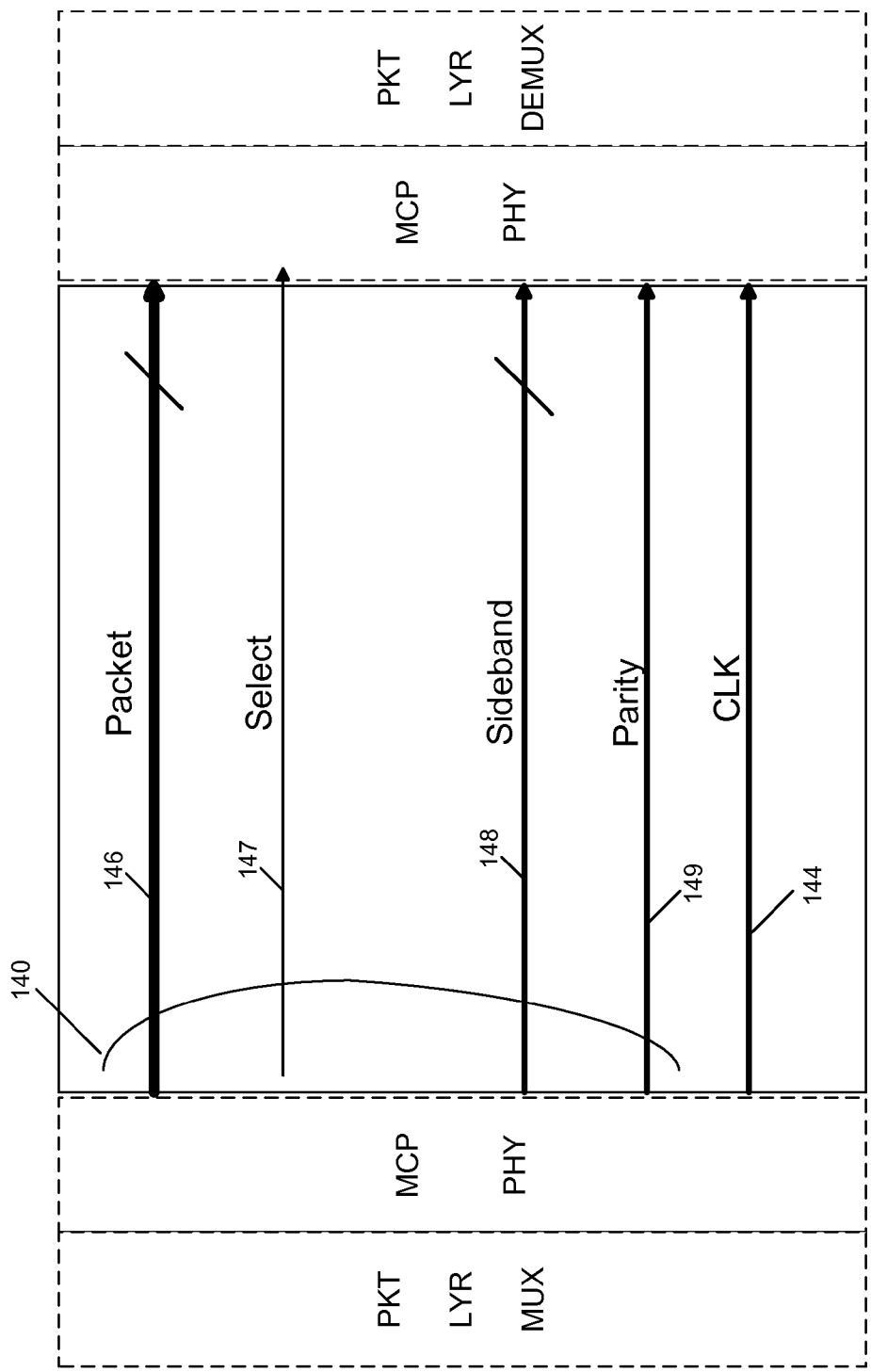
FIG. 3 is a block diagram of a packetized link in accordance with one embodiment of the present invention.

Referring now to FIG. 3, shown is a block diagram of a packetized link in accordance with one embodiment of the present invention. As shown in the embodiment of FIG. 3, packetized link 140 includes various components or links. First, the link includes a packetized link 146 which may be a set of wires defined to carry command, data, cyclic redundancy code (CRC) and credit information. Thus in addition to payload data, command, error reporting, and credit information may also flow on this MCP link. This is a multiplexed interface that carries both command and data buses of the OCF interface. The command and data portions may be sent in different clock periods. In different embodiments, multiple widths of this packetized link can be provided. Thus although widths of 32-128 bits (b) may be possible, the scope of the present invention is not limited in this regard. Second, a select link signal (e.g., a 3 b signal) on a select link 147 accompanies (i.e., is in synchronization with) packetized link 146 and indicates the nature of information being transmitted over the packetized link. Note that the select signals may be optional to help reduce on-die logic needed for packetization but need not be present in a given implementation. Third, an optional sideband link 148 may be present, which can be an optional set of a few wires to transmit information that appears on a sideband bus on the OCF at a low bandwidth. As examples, this can carry debug and other secondary information that allows the MCP architecture to present the view of a single die to the software as well as to the debug tools. Still further, in some embodiments a fourth link, namely a parity link 149 may be provided. Such parity signals may be optional sideband signals sent in lieu of CRC-type information. For example, in an on-die implementation, parity may be enough, whereas for an off-die implementation both parity and CRC may be used. In addition, a clock link 144 is also shown. Note also that tight packetization need not be present, as there can be one or more bubbles present between the end of transmission of a data packet and CRC information. Still further, credit packets including such CRC information may be combined into several such packets that can be sent on the same clock. Note that in some implementations a request may always start on a new clock. For ease of illustration, only unidirectional links from left to right are shown in FIG. 3, although it is understood that similar links travel in the opposite direction.

Figure 4:
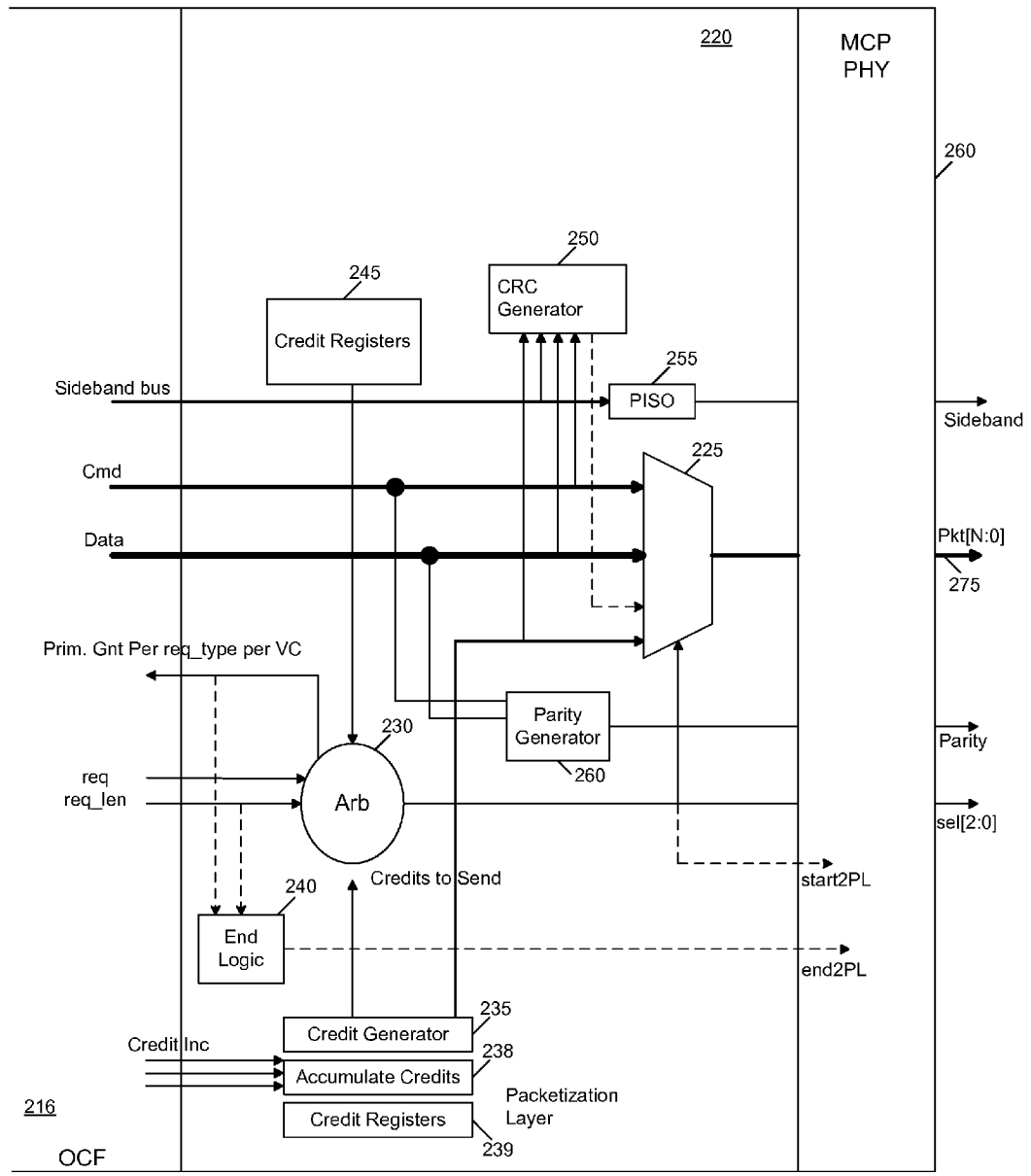
FIG. 4 is a block diagram of various components of a packetization layer for a transmit side in accordance with one embodiment of the present invention.

Referring now to FIG. 4, shown is a block diagram of various components of a packetization layer for a transmit side in accordance with one embodiment of the present invention. The key components and their key functionality are described below. As shown in FIG. 4, a packetization layer 220 which may be present in two or more die of a multi-chip package includes various transmitter side logic for interfacing between a native on-chip fabric 210 and a packetized physical layer 260 that in turn is coupled to a packetized interconnect 275 (that in turn may be coupled to another in-package die). Of course, packetized link 275 can instead be connected in an on-die manner to enable multi-cycle routing between logic on a single die as discussed above.

As shown in the embodiment of FIG. 4, packetization layer 220 includes a multiplexer 225 coupled to receive various information from fabric 210. Control of data output from multiplexer 225 may be via an arbiter 230 that is coupled to receive various signals from fabric 210, including a request signal and a request length signal. In addition, credit information from credit registers 245 (regarding credit information from a second die) may be provided, along with information from a credit packet generator 235 which in turn is in communication with a credit accumulator 238 and credit registers 239. Still further in the embodiment of FIG. 4, the various incoming command and data signals may be provided to a CRC generator 250 that provides an output to multiplexer 225. Still further, to enable sideband communications to pass through the packetized link, a sideband bus from fabric 210 may be coupled through a parallel-in-serial-out (PISO) shift register 255. An end-logic 240 may be provided to enable control of packet transitions. While shown with this particular implementation in the embodiment of FIG. 4, the scope of the present invention is not limited in this regard.

Request data bus multiplexer 225 may operate to enable the separate request and data buses of an OCF fabric to be multiplexed for transmission over a packetized MCP link. In one embodiment, the following protocol rules apply in multiplexing requests and commands over the same link. Information bits in a request will always be of fixed length. For compatibility with PCIe™ header lengths, the length may be at least 128 bits. For cases when the bandwidth of the packetized link is less than the combined request and data bandwidth of the native OCF fabric, packetization layer 220 implements buffers to hold the data while information is being sent to the receiver. In such a case, arbiter 230 withholds issuing a grant to the native OCF fabric to ensure that the packet (request or data) is drained before a new grant signal is issued.

Arbiter 230 is responsible for various functions with respect to data transfers across the packetized link. In one embodiment, arbiter 230 may monitor request signals from the native fabric; monitor request to send credit packets from credit generator 235; check the request type, request length (provided as part of the request) and check for availability of credits on the receiver. The credits available are maintained in a set of registers 245 in credits available block on a per virtual channel (PCIe™ virtual channel) and per request type (PCIe™ request type) basis. Arbiter 230 further acts to monitor the packetization link usage (occupancy) and schedule either command, command plus data OR credit packets on the packetization link; decide between which of multiple packets to send (different request packet types and credit packets); generate select [2:0] signals to indicate what information is being transmitted from the transmitter to the receiver; and generate a grant signal to the credit generator or OCF packetization layer.

Credit packet generator 235 receives credit increase signals from the native OCF and generates credit packets. Key functionalities of credit generator 235 include, in one embodiment: receiving credit change information from the native OCF layer; assimilating the information in accumulator registers on a per virtual channel (PCIe™ virtual channel) and per request type basis; indicating to arbiter 230 when credits are ready to be transmitted; and creating a credit packet when a grant is received from the arbiter.

In some embodiments an apparatus for a physical layer interface to physical layer 260 may take the form of PISO 255, which is an optional module to take parallel input from the sideband bus port (note that the sideband/sideband bus is optional) and generate a serial interface that forwards sideband/sideband bus packets to the receiver. In one embodiment, the definition of bits is as follows: 1 bit for data; 1 bit for strobe (to indicate valid data); and the sideband bus can function at the same frequency as the packetized link. CRC generator 250 may be present where CRC support in the packetization link is provided and may carry a 32 bit CRC signal in one embodiment. In case a CRC signal is generated, it will be padded to request only, request and data, and credit packets. CRC will be appended on the clock after the clock when the last double word (DWORD) of a packet is transmitted (unlike PCIe™ where the request/data packet and CRC can appear on the same clock). End logic 240 may act primarily to interface with a physical layer and monitors the request, request length and grant signal to indicate start and end of packets to the physical layer.

Figure 5:
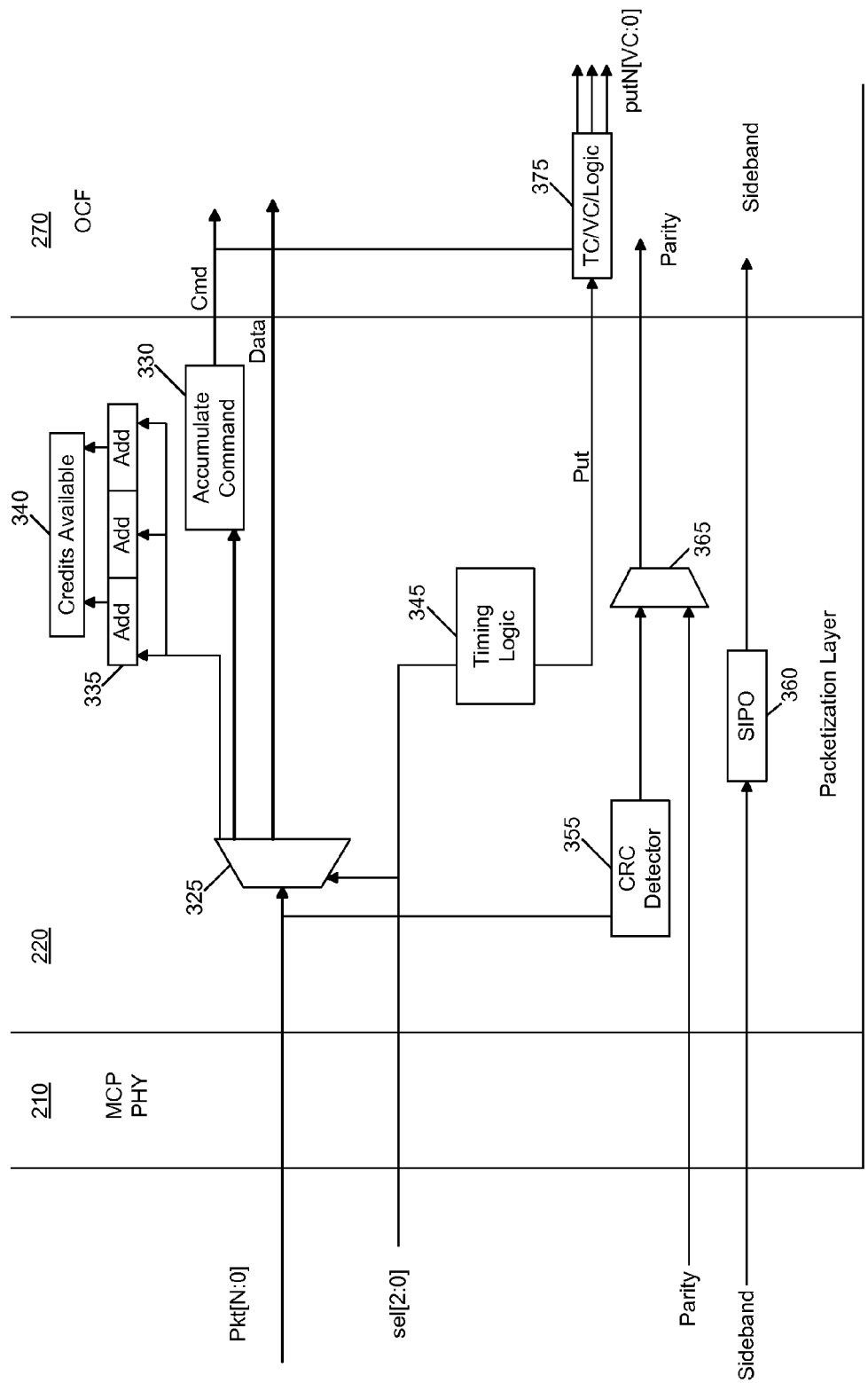
FIG. 5 is a block diagram of various components of a packetization layer for a receive side in accordance with an embodiment of the present invention.

FIG. 5 is a block diagram of various components of a packetization layer for a receive side in accordance with an embodiment of the present invention. Note that a packetization layer present in each die of a MCP may include both the receive logic of FIG. 5 as well as the transmit logic of FIG. 4. The key components and their key functionality are described below.

As shown in FIG. 5, on a receive side packetization layer 220 is coupled between a physical layer 210 and a native fabric 270. Incoming data from the data packet link may be provided to a de-multiplexer 325. Outputted data may be provided out to native fabric 270 directly, while in certain implementations a command buffer 330 may be present to accumulate command data until a full command portion has been received. For credit information, de-multiplexer 325 is coupled to a plurality of adders 335 which in turn are coupled to a set of credit registers 340.

Control of de-multiplexer 325 may be via received select signals which are also coupled to a timing logic 345 that may be used to ensure that commands are aligned with a put signal generated from timing logic 345, as discussed further below. In addition, a CRC detector 355 may be coupled to receive the incoming data to determine whether CRC data is valid. This detector may be coupled along with a parity signal received from the physical layer to a multiplexer 365. Furthermore, a serial-in parallel-out shift register (SIPO) 360 may be coupled to receive the sideband information and provide it to native fabric 270. Note that the put signal generated by timing logic 345 may be provided to a transaction channel/virtual channel logic 375 which may identify a put signal for a given virtual channel. This signal indicates to the OCF the start of a new packet. The signal might have a different name but the same effect in different embodiments.

Packetization bus de-multiplexer 325 forwards command (header), data and credit packets based on the select signal that was received on the packetized link. It is to be noted that it is possible in some cases that a header packet can arrive over multiple clocks (for example, if the packetization link was 32 bits and the header was 128 bits). In such a case, the header bits can be temporarily stored in buffer 330. Timing logic 345 may be implemented as a series of flip-flops which align the packet start indication on the select [2:0] signal with the actual completion of the packet header (via an accumulate command). The put signal is generated when all the bits associated with the packet length are available. CRC logic 355 checks the CRC values associated with receipt of packets and generates data/command parity errors to the native OCF (which does not support CRC) in case it detects an error. SIPO 360 de-serializes the sideband bus in cases where sideband bus is present. This logic monitors the serial bus and accumulates the bits when the data is valid. It forwards the packet when all the packet bits have been received. While shown with this particular implementation in the embodiment of FIG. 5, the scope of the present invention is not limited in this regard.

A packetization layer in accordance with an embodiment of the present invention may have its own protocol (rules) on the timing of command, credit and other signals, some that can be used for various packet handling operations. The following set of rules may be part of a protocol in accordance with an embodiment of the present invention. A bit vector (i.e., select [2:0]) accompanies the packetized link to indicate what is being transmitted on the packetized link. Note there is no gap between time when the packet header is transmitted and packet data is transmitted. Packet header and data bits do not appear on the packetized link on the same clock, e.g., the packet header may be first transmitted, followed by the data portion. In cases where the header is not an even multiple of width of the packet link (e.g., when a 3DW (96 bits) packet header is transmitted over a 64 b packetized interface), zeroes will be transmitted as a pad for the data being sent. Multiple credits can be sent across the packet in a single clock for high bandwidth data update. CRC bits do not appear on the same clock as the header or the data flows on the packetized link for credit packets. CRC bits are sent on the same clock as the credit packets. No time relationship exists between request and grant signals and no requests are re-ordered over the packetization link. Further, note also that the protocol may be non-retry in contrast to a PCIe™ implementation. In one embodiment, a protocol for the in-package packetized link is to provide for optional error checking, and use a forwarded clock architecture and independent uni-directional links between the first semiconductor die and the second semiconductor die.

Figure 6:
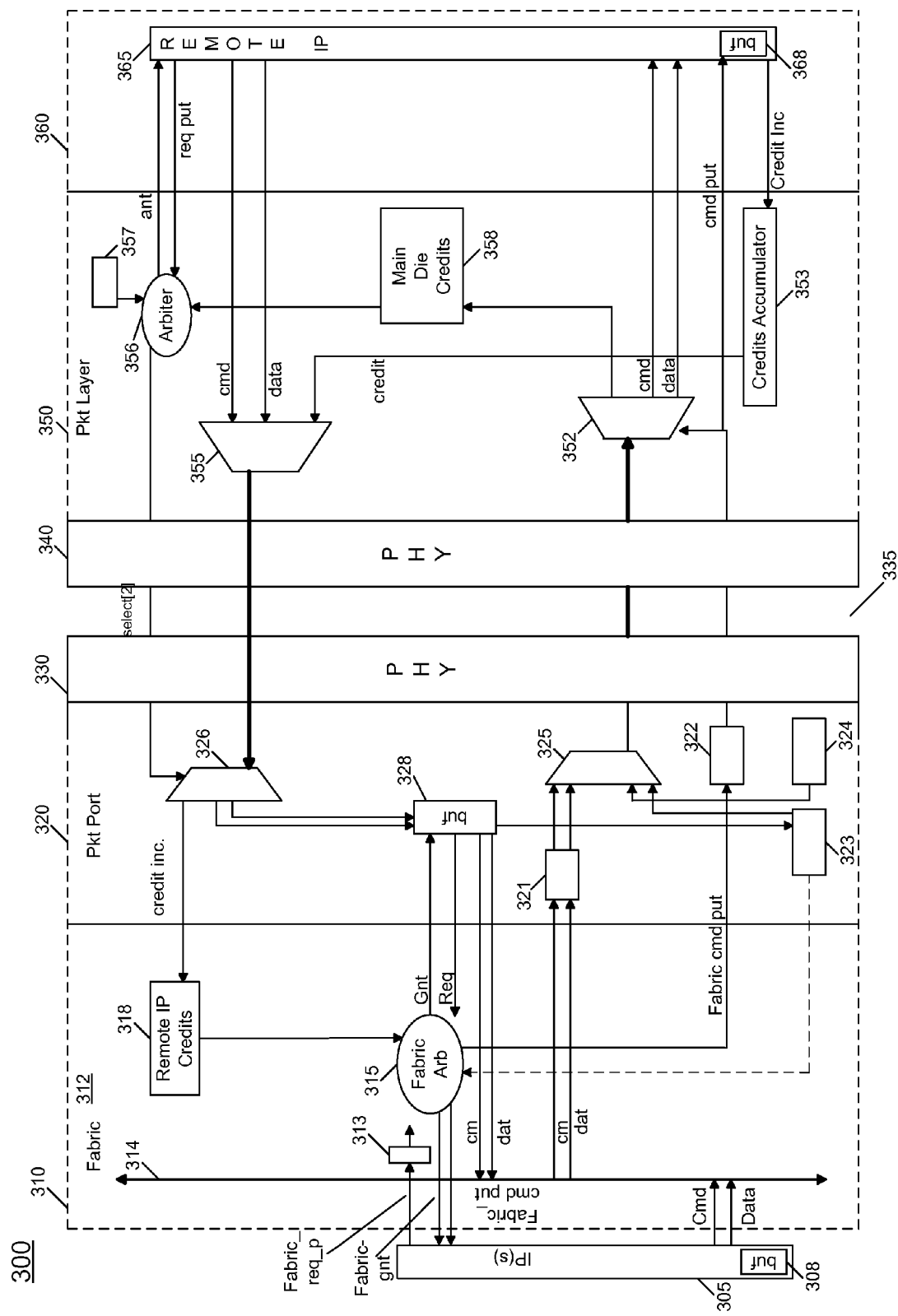
FIG. 6 is a block diagram of two semiconductor dies coupled in accordance with an embodiment of the present invention.

The above discussion focuses on protocols and implementation (micro-architectural) for how to connect two OCF protocol die logic in a point-to-point topology. The implementation details for the case when one of the dies has a fabric that follows a one-to-many or many-to-one topology can be different. FIG. 6 shows a block diagram of an implementation of a port that connects a single OCF endpoint (e.g., on an expansion die) to another die that has a shared bus or other non-point-to-point fabric. FIG. 6 shows the implementation of such logic. FIG. 6 shows a second die 360 which may be an OCF endpoint that is connected to a first die 360 that has an OCF fabric based on a shared bus topology. In addition to the elements described with regard to FIGS. 4 and 5, additional components may be present.

As shown in FIG. 6, a MCP 300 includes first die 310 and second die 360. In the embodiment shown, first die 310 has a fabric 312 that includes a shared or dedicated bus 314. This bus enables communication with various IP blocks 305 of the die, each of which may include one or more buffers to queue up data and command information to be sent to fabric 310. In addition, bus 314 may provide for communication of received command and data information as well as transmission of fabric request put and grant signals. Such request put signals may be coupled to a command queue 313 that in turn is coupled to a fabric arbiter 315 that further receives input regarding credits from a credit register block 318 which may store credit information received from a remote IP block 365 present on second die 360.

Fabric 312 is coupled to packetized port 320 that includes incoming and outgoing multiplexer 325 and de-multiplexer 326, which acts to receive packets and output command and data information through a buffer 328. An additional buffer 321 may be coupled to hold incoming command and data information from fabric 312 and which may be arranged as a buffer per request type. Various logic may further be present in packetized port 320 including put logic 322 which may be used to generate a command put signal, a credit packet generation logic 323, and CRC generation logic 324. Note a throttle signal may indicate the availability of the packetized link (and which may be coupled between an arbiter and a bus monitor on the packetized part). This signal is used to indicate to the OCF fabric that the packetized link is currently not available. The packetization layer logic can use the link to transmit credit packets or CRC information. When the throttle signal is "high", the fabric arbiter in fabric 312 does not generate a grant.

In turn, packetized port 320 is coupled to a physical layer 330 that in turn may provide communication to a packetized link 335, which may be an intra-package link between first die 310 and second die 360.

Second die 360 includes, in addition to one or more IP blocks 365, each of which may include a buffer 368 for buffering of incoming command and data information, a packetization layer 350 and a physical layer 340. As seen, packetization layer 350 includes an incoming de-multiplexer 352 and an outgoing multiplexer 355. Communications can be controlled via an arbiter 356 that is in communication with a credit register 358 that may store information regarding credits from first die 310 and a put-signal generation logic 357. Outgoing credits may be stored in a credit accumulator 353 that receives a credit increment signal from IP block 365 and in turn is coupled to outgoing multiplexer 355. Note that in second die 360, the fabric is implemented in the IP block 365. That is, the IP block is OCF-compatible, but is not designed for use as an expansion device. Thus when adding that IP block (which may have been from another design) into a MCP as an expansion device, communications can be improved. While shown with this particular implementation in the embodiment of FIG. 6, the scope of the present invention is not limited in this regard.

Figure 7:
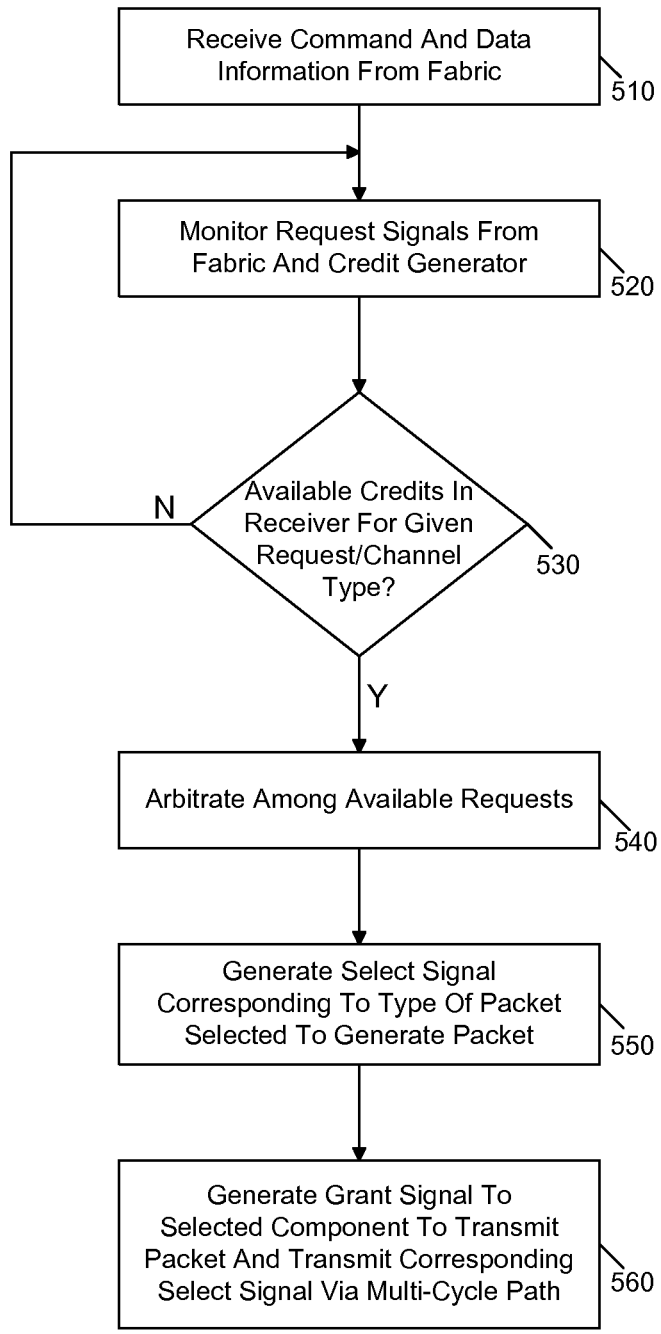
FIG. 7 is a flow diagram of a method for transmitting packets in accordance with one embodiment of the present invention.

Referring now to FIG. 7, shown is a flow diagram of a method in accordance with one embodiment of the present invention. As shown in FIG. 7, method 500 may be used to transmit information received via an on-chip fabric through a packetized interconnect in accordance with an embodiment of the present invention. As shown in FIG. 7, method 500 may begin by receipt of command and data information from the fabric (block 510). As discussed above in various implementations, separate command and data buses may be present in a given fabric, both of which may be coupled to a multiplexer of a packetization layer, which receives this information. Next, an arbiter may monitor request signals from the fabric and a credit generator (block 520). Accordingly, based on these signals, an arbiter may determine whether available credits are present in a receiver for a given request channel/type (diamond 530). If so, control passes to block 540 where an arbitration may occur among available requests.

In various implementations, different manners of arbitrating among the requests may be realized. The arbitrator may generate a select signal corresponding to the type of packet selected and the packet may be generated with header information and a payload using the multiplexer and a CRC generator and so forth (block 550). If a credit-type packet is selected, such credit packet may be generated and provided to the multiplexer. To enable transmission, the arbitrator may generate a grant signal to the selected component to transmit the packet, which is transmitted via a multi-cycle path (i.e., of the packetized interface) to enable transmission across the packetized interconnect to a receiver (block 560). While shown with this particular implementation in the embodiment of FIG. 7, the scope of the present invention is not limited in this regard.

Figure 8:
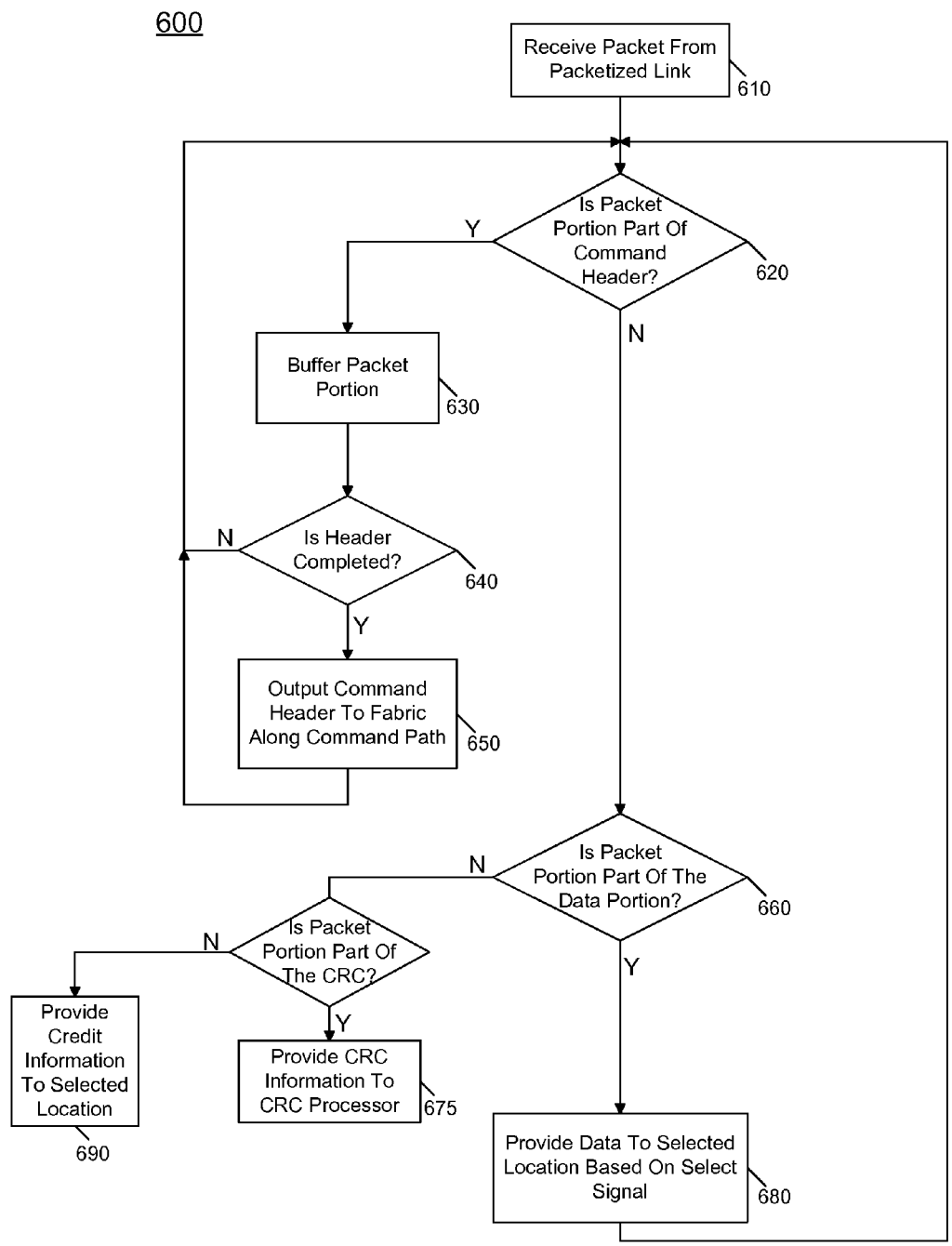
FIG. 8 is a flow diagram of a method for handling receipt of packets in accordance with an embodiment of the present invention.

Referring now to FIG. 8, shown is a flow diagram of a method for handling receipt of packets in accordance with an embodiment of the present invention. First, the packet may be received from the packetized link (block 610). Next, it may be determined if a packet portion is part of a command header (diamond 620). If so, the packet portion may be buffered, e.g., in a command buffer (block 630). Then it may be determined whether the header is completed (diamond 640). If so, the command header may be output from the receiver interface, i.e., the packetization layer, to a coupled fabric (block 650).

If instead it is determined at diamond 620 that the packet portion is not part of the command header, control passes to diamond 660 where it may be determined whether such packet portion is part of a data portion. If not, it may be determined whether the packet portion is CRC information (diamond 670). If so, the CRC information may be provided to a CRC processor such as a CRC detector (block 675). If not, this indicates that the packet portion is part of a credit request and accordingly, the packet portion is provided to one or more credit registers of the packetization layer (block 690). Finally, if it is determined that the packet portion is a data portion, control passes to block 680, where the packet portion may be provided to a selected location, e.g., of the fabric, based on a select signal. While shown with this particular implementation in the embodiment of FIG. 8, the scope of the present invention is not limited in this regard.

Embodiments of a packetization layer and MCP link provide a low wire solution for extending an OCF protocol to a die-to-die connectivity solution. The packetization layer provides high efficiency of usage for the wires that are at a premium for die-to-die connectivity. A packetization layer in accordance with an embodiment of the present invention can provide close to ideal (e.g., PCIe™ like) wire efficiency at a very low cost for link widths between 32 b and 128 b. As such, the packetization layer protocol provides a narrow protocol communication between blocks to easily convert a native OCF interface to a packetized interface. The narrow interface relieves routing congestion for placement and routing within a component. The packetization layer provides the foundation for a multi-chip packetization solution, the reduced number of wires and the protocol built in the packetization layer helps provide a low power high bandwidth interface.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on a chip (SoC) comprising:
a plurality of processor cores coupled via a ring and configured on a first semiconductor die;
a fabric coupled to the plurality of processor cores and to communicate with at least one agent on the first semiconductor die according to an on-chip protocol, the on-chip protocol a native non-packetized protocol; and
a packetization logic configured on the first semiconductor die and coupled to the fabric to receive command information from the fabric on a command link and data information from the fabric on a data link and to generate packets for transmission from the first semiconductor die to a second semiconductor die coupled thereto, each of the packets including one of the command information, the data information, and credit information in a multiplexed manner in which the command information and the data information are sent in different clock periods, wherein the packetization logic includes an arbiter to select one of the packets to enable the transmission from the first semiconductor die to the second semiconductor die if the second semiconductor die has a sufficient number of credits to receive the packet.

2. The SoC of claim 1, further comprising a credit request generator to generate a credit packet responsive to credit signals received from the fabric.

3. The SoC of claim 1, wherein the packetization logic includes a buffer to receive and store the data information and the command information and to output a portion of the command information or the data information under control of the arbiter.

4. The SoC of claim 1, wherein the packetization logic is to generate a select signal for transmission from the first semiconductor die to the second semiconductor die to indicate a type of information sent along lanes of an in-package link that couples the first and second semiconductor dies, wherein the on-chip protocol has a single cycle configuration and the in-package link has a multi-cycle configuration.

5. The SoC of claim 4, wherein the number of the lanes of the in-package link is substantially smaller than a number of lanes of the command link and the data link, and information to be communicated on the in-package link is multiplexed to include the command information and the data information.

6. The SoC of claim 1, wherein the plurality of processor cores are of a first vendor and the at least one agent is of a different vendor.

7. The SoC of claim 6, wherein the packetization logic is to operate across a multi-cycle path via an in-package link coupled between the first and second semiconductor dies.

8. The SoC of claim 7, further comprising a multi-chip package including the first semiconductor die and the second semiconductor die coupled thereto by the in-package link, the second semiconductor die including a second packetization logic to receive the packet and to separate the command information from the data information.

9. The SoC of claim 8, wherein the second packetization logic includes a timing logic to receive a select signal and to generate a put signal which indicates to a receive side fabric that a command portion of the packet is available.

10. The SoC of claim 7, wherein a protocol for the in-package link includes independent uni-directional links between the first semiconductor die and the second semiconductor die.

11. A method comprising:
receiving command information and data information in a packetization layer of a first semiconductor die of a multi-chip package including the first semiconductor die and a second semiconductor die from a first agent of the first semiconductor die;
monitoring requests from the first agent and a credit generator in an arbiter of the packetization layer, determining whether available credits are present in the second semiconductor die for a given request channel/type to obtain a plurality of available requests, and arbitrating among the plurality of available requests to select a request for handling; and generating a packet for the selected request from the command information and the data information and transmitting the packet across an interconnect between the first semiconductor die and the second semiconductor die in a multiplexed manner in which the command information and the data information are sent in different clock periods.

12. The method of claim 11, further comprising buffering the command information and the data information in a buffer of the packetization layer until the available credits are present in the second semiconductor die.

13. The method of claim 11, further comprising generating a select signal for transmission of the packet from the first semiconductor die to the second semiconductor die to indicate a type of information sent along lanes of the interconnect.

14. The method of claim 13, further comprising generating a credit packet responsive to credit signals received from the first agent, and enabling transmission of the packet from the first semiconductor die to the second semiconductor die if the second semiconductor die has a sufficient number of credits to receive the packet.

15. The method of claim 13, further comprising receiving the select signal in a packetization layer of the second semiconductor die and generating a put signal when a command portion of the packet is available in a command buffer.

16. The method of claim 11, further comprising transmitting information of a sideband bus of the first semiconductor die from the first semiconductor die to the second semiconductor die across a sideband link as a sideband packet.

17. A system comprising:
a multi-chip package including a first die and a second die, the first die including a fabric interface to communicate with at least one agent on the first die according to a native non-packetized protocol having a single cycle configuration and to communicate with at least one off-package agent via a second protocol, and a packetization layer coupled to the fabric interface to receive command information and data information from the fabric interface and to packetize the command information and the data information into a packet for transmission from the first die to the second die in a multiplexed manner via an intra-package link having a multi-cycle configuration; and
a second package coupled to the multi-chip package via an off-chip interconnect, the second package coupled to the fabric interface via an interface including a transaction layer, a data link layer, and a physical layer.

18. The system of claim 17, wherein the second die has a second packetization layer to receive the packet and to separate the command information from the data information.

19. The system of claim 18, further comprising a credit request generator to generate a credit packet responsive to credit signals received from the fabric interface, and an arbiter to enable transmission of the packet from the first die to the second die if the second die has a sufficient number of credits to receive the packet.

20. The system of claim 17, wherein the intra-package link includes a first plurality of unidirectional wires to transmit signals from the first die to the second die and a second plurality of unidirectional wires to receive signals from the second die in the first die, wherein the number of the first and second plurality of unidirectional wires are asymmetrical.

* * * * *